(12) United States Patent
Sørensen

(10) Patent No.: US 12,458,214 B2
(45) Date of Patent: Nov. 4, 2025

(54) ENDOSCOPE

(71) Applicant: AMBU A/S, Ballerup (DK)

(72) Inventor: Morten Sørensen, Ballerup (DK)

(73) Assignee: AMBU A/S, Ballerup (DK)

( * ) Notice: Subject to any disclaimer, the term of this patent is extended or adjusted under 35 U.S.C. 154(b) by 374 days.

(21) Appl. No.: 18/029,462

(22) PCT Filed: Sep. 30, 2021

(86) PCT No.: PCT/EP2021/076926
§ 371 (c)(1),
(2) Date: Mar. 30, 2023

(87) PCT Pub. No.: WO2022/069619
PCT Pub. Date: Apr. 7, 2022

(65) Prior Publication Data
US 2023/0346208 A1 Nov. 2, 2023

(30) Foreign Application Priority Data
Oct. 1, 2020 (EP) ..................... 20199519

(51) Int. Cl.
*A61B 1/00* (2006.01)
*A61B 1/008* (2006.01)
*A61B 1/018* (2006.01)

(52) U.S. Cl.
CPC .......... *A61B 1/018* (2013.01); *A61B 1/00018* (2013.01); *A61B 1/008* (2013.01)

(58) Field of Classification Search
CPC ..... A61B 1/018; A61B 1/00018; A61B 1/008; A61B 1/0008; A61B 1/00087;
(Continued)

(56) References Cited

U.S. PATENT DOCUMENTS 9,220,400 B2   12/2015 Petersen
10,321,804 B2    6/2019 Jacobsen et al.
(Continued)

FOREIGN PATENT DOCUMENTS

WO      2014186521 A1   11/2014
WO   WO-2016041300 A1 *  3/2016   ............. A61B 1/012

OTHER PUBLICATIONS

International search report and written opinion in International Application No. PCT/EP2021/076926, Feb. 8, 2022, 10 pages.
(Continued)

*Primary Examiner* — Timothy J Neal
(74) *Attorney, Agent, or Firm* — Faegre Drinker Biddle & Reath LLP

(57) ABSTRACT

An endoscope including a handle and an insertion tube having a tip part (1) at the distal end and a working channel tube connected to a working channel passage (4) in the tip part (1). The working channel passage (4) is circumferentially delimited by a working passage inner wall surface (7) and the working channel passage (4) has a proximal end including a proximal end surface (15) and a distal end. The tip part (1) includes a housing (3) with a housing centre axis (C). The working channel passage inner wall surface (7) includes at least one inner surface wall section having rotational symmetry about a working channel centre axis (c) and extending at least partially between the proximal end and the distal end of the working channel passage (4). The working channel centre axis (c) is arranged at an angle to the housing centre axis (C).

18 Claims, 3 Drawing Sheets

(58) Field of Classification Search
CPC .............. A61B 1/00089; A61B 1/0011; A61B 1/00119; A61B 1/012
See application file for complete search history.

(56) References Cited

U.S. PATENT DOCUMENTS

| | | |
|---|---|---|
| 11,291,352 B2 | 4/2022 | Vilhelmsen et al. |
| 2007/0249907 A1 | 10/2007 | Boulais et al. |
| 2014/0296631 A1* | 10/2014 | Miyamoto ............ A61B 1/0014 600/106 |
| 2017/0245734 A1 | 8/2017 | Kaneko |
| 2018/0153381 A1 | 6/2018 | Wei et al. |
| 2018/0160893 A1* | 6/2018 | Truckai .................. A61B 1/005 |
| 2018/0289242 A1 | 10/2018 | Dai |
| 2021/0093175 A1 | 4/2021 | Sørensen et al. |
| 2021/0228064 A1 | 7/2021 | Sørensen et al. |

OTHER PUBLICATIONS

Extended search report in European Application No. 20199519.8, Apr. 9, 2021, 6 pgs.

* cited by examiner

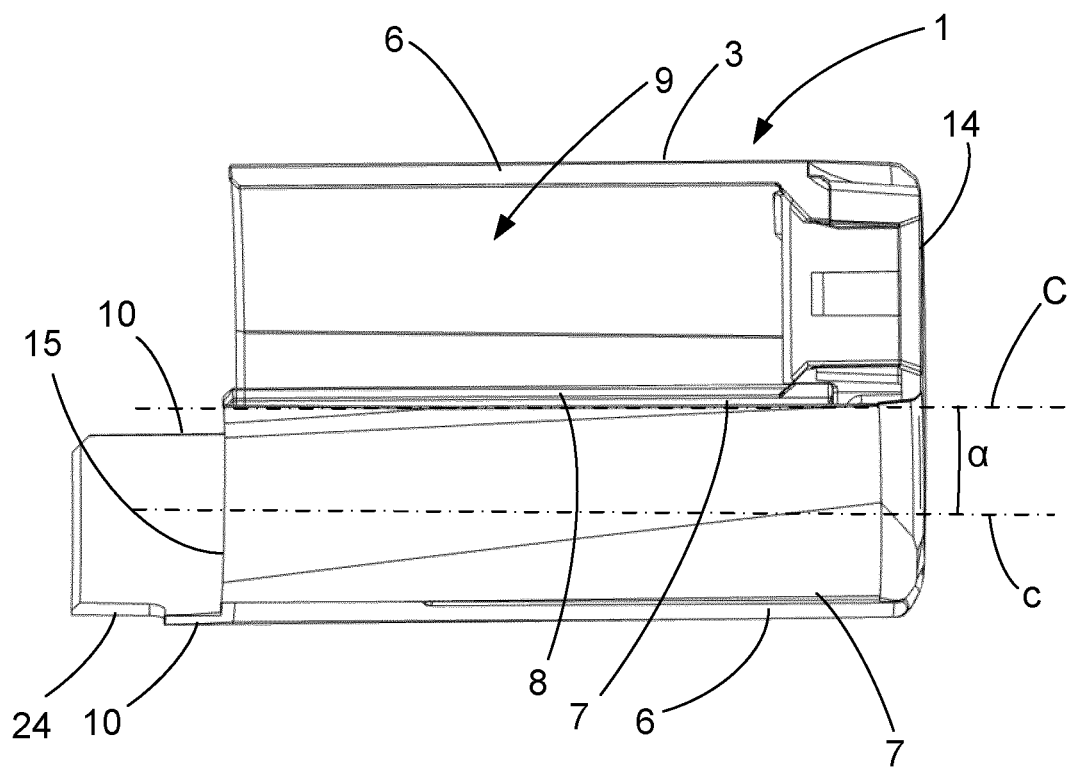
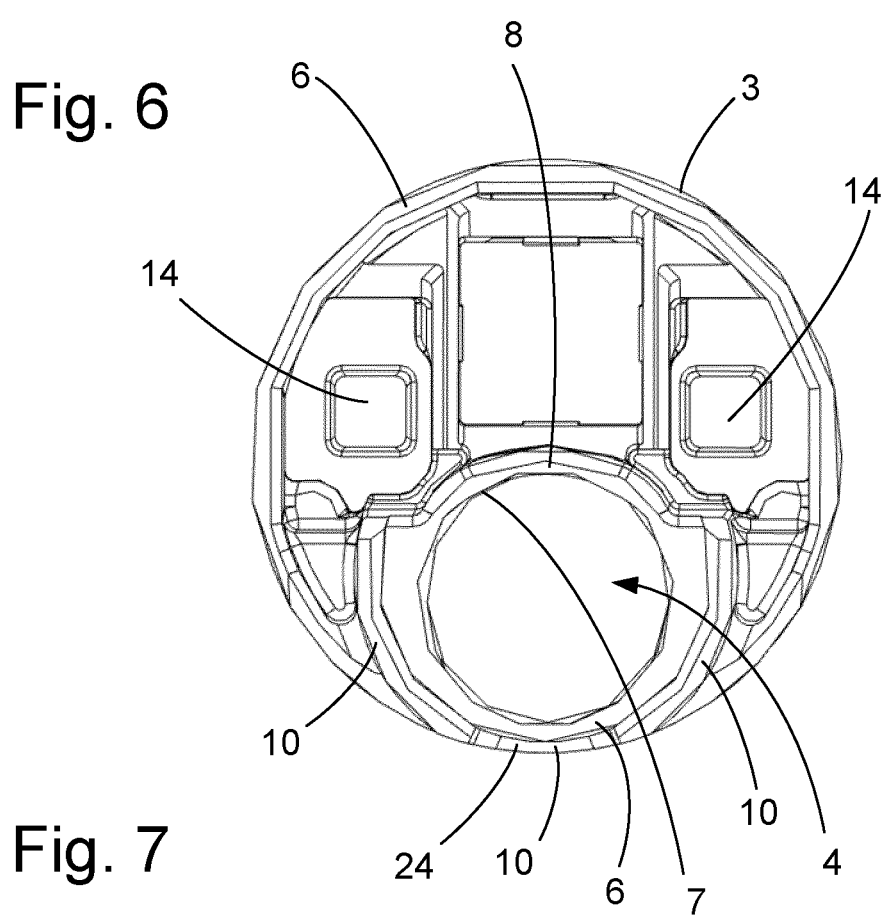
Fig. 6
Fig. 7

ENDOSCOPE

CROSS REFERENCE TO RELATED APPLICATIONS

This application is a National Phase entry under 35 U.S.C. § 371 of International Application No. PCT/EP2021/076926, filed Sep. 30, 2021, which claims the benefit of and priority from European Patent Application No. 20199519.8, filed Oct. 1, 2020. The foregoing applications are incorporated by reference herein in their entirety.

The present disclosure relates to endoscopes, more specifically to the tip part of an insertion endoscope.

Insertion endoscopes normally comprise a proximal handle from which an insertion tube extends towards the distal end of the endoscope. At the distal end the insertion tube comprises an articulated bending section the bending of which can be controlled by an operator using wheels and/or levers or the like at the handle. The articulated bending section comprises a number of articulated segments including a proximal segment for attachment to a tube forming the main body of the insertion tube, a number of intermediate segments, and a distal end segment comprising a tip part inter alia accommodating illumination and imaging electronics of the endoscope. In the endoscope, a working channel extends from an entry port in the handle through the insertion tube to an exit port in the distal end segment.

Figures 1, 2:
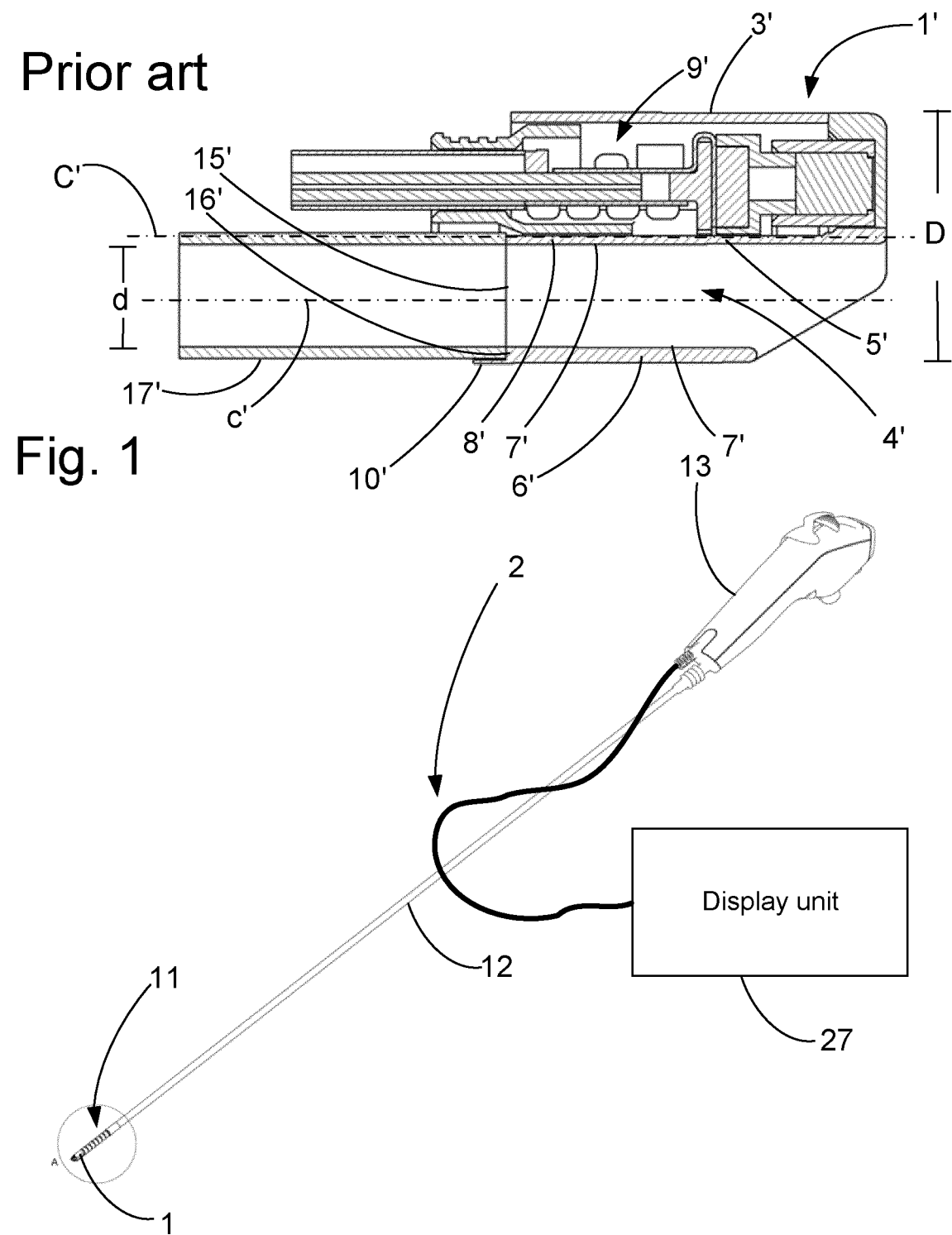

An example of such an insertion endoscope is known from EP3539449 incorporated herein by reference. As part of the distal segment this prior art endoscope comprises a tip housing as shown in FIG. 1 comprising an electronics compartment for accommodating inter alia said illumination and imaging electronics. Alongside the electronics compartment a working channel passage serving as a part of the working channel extends. The tip housing is manufactured from plastic materials in a two-component insertion moulding process, comprising a transparent component for windows in front of the illumination devices and the imaging device. The other component preferably is opaque or dyed in order to absorb stray light from the illumination devices to enter directly into the imaging device. The working channel passage is contiguous with a working channel tube serving as the working channel though the insertion tube and optionally inside the handle.

As the insertion tubes of endoscopes are intended to be inserted into other objects, e.g. via a natural opening into a cavity within the human body, the external dimension of the insertion tube and tip thereof is a limiting factor. That is to say, there is a need for the best possible utilization of the available cross-section, e.g. in order to reduce the overall dimension to make access through even smaller body passages, or to be able to introduce larger tools through a body passage of a given dimension, i.e. accommodating the largest possible working channel in an insertion tube including the tip part of a given outer dimension.

One of the limiting factors in the above prior art is the thickness of the partitioning wall separating the electronics compartment from the working channel passage. Even though low voltages are used for the electronics there is a risk of electrical breakdown of the plastic material if the partitioning wall is made too thin or has microdefects resulting from the manufacturing process, resulting in an electrical discharge between the electrically conducting parts in the electronics compartment, and conductive parts in the working channel passage, e.g. metal tools and/or electrolytes, such as saline solutions. Furthermore, medical equipment should comply to relevant parts of technical standards, such as IEC 60601.

Another limiting factor is a glue flange provided at the periphery of the tip housing. Simply gluing the abutting end faces of the working channel tube and the working channel tube together may not yield sufficient strength at the periphery where the bending forces are largest. Accordingly, the glue flange is provided in order to accommodate additional glue and ensure sufficient gluing strength at the periphery between the end face surrounding the proximal end of the working channel passage in the tip housing and the distal end face of the working channel tube. Although, this glue flange is very thin it still adds to the wall thickness of the working channel wall, in particular where it coincides with the external wall of the tip housing. That is to say, if a smooth internal lumen in the working channel is to be so that tools or the like will not get stuck, the outer wall of the working channel passage needs to be thicker than the wall of the abutting working channel tube and thus extend slightly more in the cross-wise direction of the tip housing.

Based on this it is the object of the present disclosure to reduce the overall cross-wise dimension of the tip housing.

According to a first aspect of the disclosure, this object is achieved by an endoscope comprising a handle and an insertion tube, the insertion tube comprising a tip part at the distal end thereof and a working channel extending from the handle to the tip part within the insertion tube, said working channel comprising a working channel tube with a predetermined inner diameter (d) connected to a working channel passage in said tip part, said working channel passage being circumferentially delimited by a working passage inner wall surface of a working channel passage wall, and said working channel passage having a proximal end comprising a proximal end surface and a distal end, where said tip part comprises a housing with at least one section having a circumferential surface in the shape of a cylinder with a housing centre axis (C) and an outer diameter (D), and where said working channel passage inner wall surface comprises at least one inner surface wall section having rotational symmetry about a working channel centre axis (c), and extending at least partially between said proximal end and said distal end of the working channel passage, where the proximal end surface is adapted to abut said distal end surface face of the working channel tube with a layer of adhesive between them for forming said connection, wherein at least a part of said working channel passage is arranged at an angle to said housing centre axis (C).

In this way the external wall part of the working channel passage may be made thinner, in turn, either allowing the overall external dimension of the tip part or allowing more space for the various components to be accommodated within the tip part. This while still maintaining a good glue joint between the working channel tube and the working channel passage in the tip part.

According to an embodiment of the disclosure, said tip part comprises a compartment for accommodating electronic components of the imaging system, said compartment being separated from the working channel passage by an internal partitioning wall of the tip part, said internal partitioning wall forming part of the working channel passage wall, wherein said internal partitioning wall comprises a transition sector between said working channel passage end surface and said cylindrical inner surface wall section, wherein in said transition sector the thickness of said internal partitioning wall is gradually reduced towards said working channel passage end surface.

This aids in providing the angle between the working channel passage and the working channel tube i.e. the angle of the glued interface between them with respect to the central cylindrical axis of the working channel passage.

According to an embodiment of the disclosure, the angle working channel centre axis (c) with respect to the housing centre axis (C) is in the interval between 15° and 1°, in particular approximately 6° or 1.03°. Experience has shown that this deviation in alignment—even if it may seem little, between the working channel passage and the working channel tube yields a useful reduction in the thickness of the external wall.

According to an embodiment of the disclosure, said tip part comprises a compartment for accommodating electronic components of the imaging system, said compartment being separated from the working channel passage by an internal partitioning wall of the tip part, said internal partitioning wall forming part of the working channel passage wall, and wherein said internal partitioning wall comprises a transition sector between said working channel passage end surface and the remainder of the inner surface wall, and wherein in said transition sector the thickness of said internal partitioning wall is gradually reduced towards said working channel passage end surface.

Experience has shown that while reducing the overall dimensions of the tip part, this gradual reduction or tapering does not jeopardise the electrical insulation protecting the electronic components in the electronics compartment.

According to an embodiment of the disclosure, said working channel passage comprises an external wall, where said external wall comprises a transition sector between said working channel passage end surface and said cylindrical inner surface wall section, wherein in said transition sector the thickness of said external wall is gradually increased towards said working channel passage end surface. This aids in increasing the area of the end surface, i.e. the glue surface, at the at the periphery of the tip part, where the bending forces are the largest, and thus improves strength of the glue connection between the working channel passage and the working channel tube.

According to an embodiment of the disclosure, in said transition sector the thickness of the internal wall sector is reduced as the thickness of the external wall is increased so as to maintain a constant diameter of the working channel passage corresponding to that of the cylindrical inner surface wall section. This allows a smooth transition between the working channel passage and the working channel tube, even if they are as such not aligned.

According to a second aspect of the disclosure the object is achieved by a method of manufacturing an endoscope, said method comprising the steps of: providing comprising a working channel tube with a predetermined inner diameter (d), providing a tip part having a working channel passage in said tip part, said working channel passage being circumferentially delimited by a working passage inner wall surface of a working channel passage wall, and said working channel passage having a proximal end comprising a proximal end surface and a distal end, where said tip part comprises a housing with at least one section having a circumferential surface in the shape of a cylinder with a housing centre axis (C) and an outer diameter (D) and where said working channel passage inner wall surface comprises at least one inner surface wall section having rotational symmetry about a working channel centre axis (c), and extending at least partially between said proximal end and said distal end of the working channel passage, where the proximal end surface is adapted to abut said distal end surface face of the working channel tube with a layer of adhesive between them for forming said connection, wherein at least a part of said working channel passage is arranged at an angle to said housing centre axis (C), and joining said working channel tube and said tip part when said working channel passage end surface and said distal end surface face of the working channel tube are abutment using said adhesive.

This method of manufacturing ensures in a simple manner a secure and reliable joining of the working tube with the working channel passage in the tip part.

According to an embodiment of the second aspect a mandrel is inserted through the working channel passage from the distal end of the working channel passage into the working channel tube before said joining. Using a mandrel inserted from end only even though the passage is angled simplifies the gluing process when joining.

According to a third aspect of the disclosure the object is achieved by a system comprising a display unit and an endoscope according to the first aspect of the disclosure.

Figure 3:
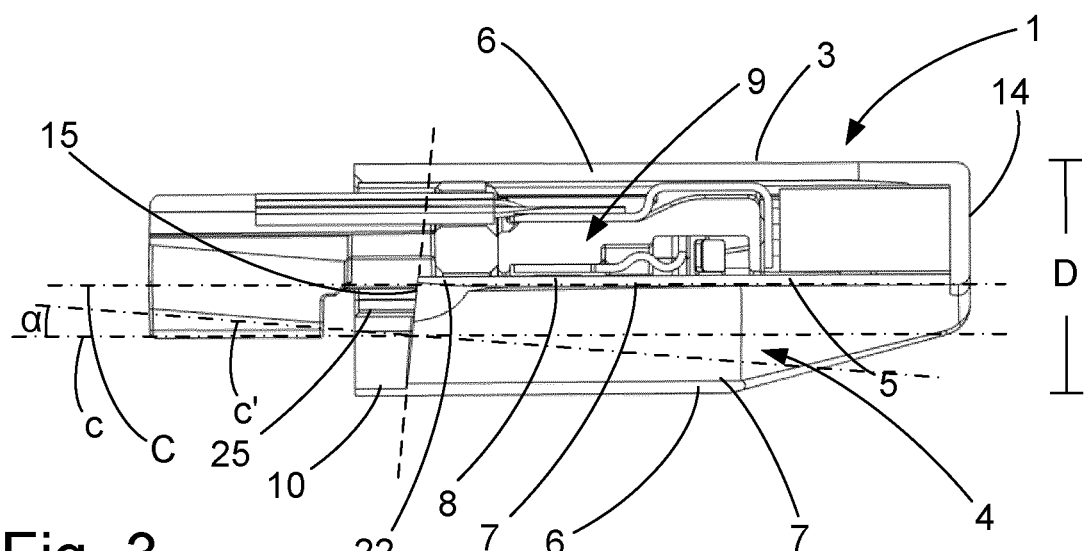
Figure 4:
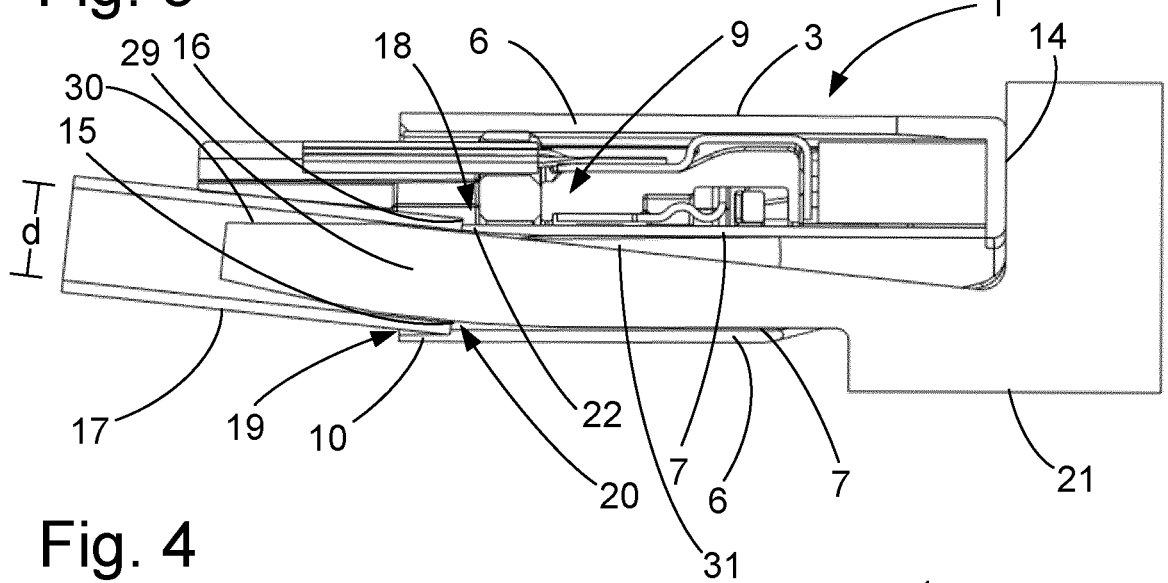
Figure 5:
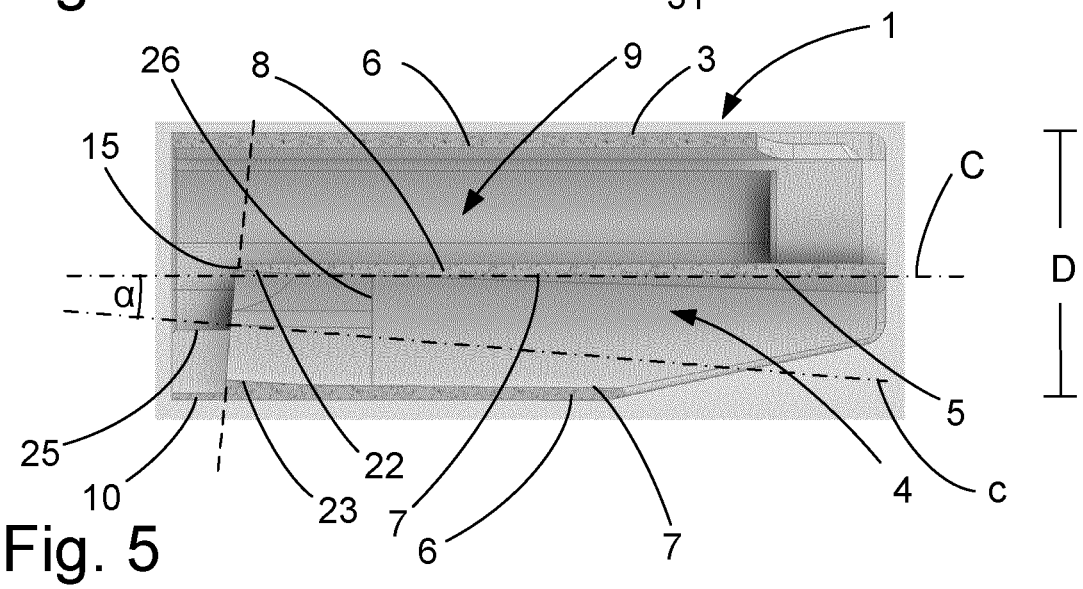

The disclosure will now be made in greater detail based on nonlimiting exemplary embodiments and the drawings, on which:

FIG. 1 shows a longitudinal section of a prior art tip part with a working channel tube glued to the working channel passage, FIG. 2 shows a perspective view of a system with a display unit and an endoscope comprising a tip part according to the present disclosure, FIG. 3 shows a longitudinal section of one embodiment of the tip part according to the present disclosure, FIG. 4 shows a longitudinal section corresponding to FIG. 3 but with a mandrel inserted for the gluing process, FIG. 5 shows a longitudinal section of another embodiment of the tip part according to the present disclosure, FIG. 6 shows a longitudinal section of a further embodiment of the tip part according to the present disclosure, and FIG. 7 shows an end view of the embodiment of the tip part according to FIG. 6.

Turning first to FIG. 1, a prior art tip part 1' for an endoscope 2 is shown in longitudinal section along a centre plane. The tip part 1' comprises a tip housing 3'. The housing 3' comprises an essentially cylindrical external wall 6' having a housing centre axis C'. A working channel passage 4' is provided through the tip housing 3'. The working channel passage 4' is formed integrally with the remainder of the tip housing 3', e.g. by injection moulding, in such a way that a part of the working channel wall 5' coincides with the external wall 6'. For moulding reasons the working channel passage 4' is slightly frusto-conical around a working channel centre axis c' extending in parallel with the housing centre axis C' in order to facilitate retraction of cores in the moulding process. The working channel 4' passage is circumferentially delimited by a working passage inner wall surface 7' of the working channel passage wall 5'. Another part of the working channel passage wall 5' defines an internal partitioning wall 8', so that an electronics chamber 9' for accommodating the electronics, such as illumination and electronic imaging components. Space is sparse, and the aim is to make the internal partitioning wall 8' as thin as possible between the working channel passage 4' and the electronics chamber 9'. There is, however, both mechanical and electrical limits to how thin the internal partitioning wall can generally be made where it is thinnest. As mentioned, the tip housing 3' is made as an integral piece by injection moulding of a plastic material. The housing is opaque in order to control light that is emitted from the illumination devices and received by the imaging device so as to avoid undesired stray light into the imaging device. The plastic material of the majority of the tip housing 3' is therefore made opaque using carbon black, which reduces the ability to insulate, and therefor increases the risk of electrical discharge from the components in the electronics chamber to (electrolytic) fluids in the working channel passage, i.e. saline solutions or bodily fluids.

Furthermore, although a thin glue flange 10' is provided at the proximal end face 15' surrounding the working channel, because the mechanical strength of the glue joint at this point is still critical and the cross-section of the wall should be the largest possible, ideally matching the area of the distal end face 16' of the working channel tube 17', but, as will be explained below, turns out not to be critical. The glue flange 10' extends in the axial direction c' of the working channel passage along a part of the periphery of the proximal end face 15'.

Turning now to FIG. 3 a tip part 1 according to the present disclosure is shown. In FIG. 3 elements corresponding to the prior art bear the same reference numerals albeit without the primes.

The tip part 1 may form the distal end of an endoscope 2 as shown in FIG. 2, such as a single-use endoscope. The endoscope 2 is connectable to a display unit 27 such as a monitor by means of a wireless connection or, as shown, a cable 28. More specifically the tip part 1 may form the distal end of a bending section 11 an endoscope 2, the bending section 11 being arranged at the distal end of an insertion tube 12 extending from a handle 13 at the proximal end of the endoscope 2. The endoscope tip part 1 may have a very small outer diameter, such as 2.9 mm, meaning that all dimensions are pushed to the limit. This is especially true for single-use endoscopes where it is important to keep costs down, so the use of exotic and expensive materials is unrealistic. The endoscope tip part 1 according to the present disclosure can be made of a suitable material, such as polycarbonate, by injection moulding. Length of the tip part 1 may be around 8 mm, such as 7.75 mm. Working channel inner diameter should be as large as possible for the endoscope outer diameter, such as in this case a working channel minimum inner diameter of 1.2 mm. Such dimensions make the endoscope suitable for bronchoscopy into the smallest parts of the lungs, and for urethroscopy. A version for larger tools, i.e. having a larger working channel diameter, is also envisaged. Such as an endoscope having an outer diameter of 5.4 mm and a working channel inner diameter of 2.2 mm.

The housing 3 thus comprises an essentially cylindrical external wall 6. A working channel passage 4 is provided through the tip housing 3. The working channel passage 4 is preferably formed integrally with the remainder of the tip housing 3, e.g. by injection moulding, in such a way that a part of the working channel wall 5 coincides with the external wall 6. The working channel passage 4 is slightly frusto-conical, i.e. at least over a part of the length thereof circumferentially delimited by a frusto-conical working passage inner wall surface 7 of the working channel passage wall 5. Another part of the working channel passage wall 5 along the circumference thereof defines an internal partitioning wall 8, so that an electronics chamber 9 for accommodating the electronics, such as illumination and electronic imaging components, is formed between the external wall 6 and the partitioning wall 8. As in the prior art, the tip housing 3 preferably should be opaque in order to control light that is emitted from the illumination devices through a front window 14 and received by the imaging device so as to avoid undesired stray light into the imaging device. The plastic material is therefore made opaque using carbon black, which is a common and cheap way of colouring. However, as mentioned carbon black has the drawback that it reduces the ability of the material to insulate, and therefor increases the risk of electrical discharge from the components in the electronics chamber to (electrolytic) fluids in the working channel passage, i.e. saline solutions or bodily fluids.

As will be seen in FIG. 3, the inner wall surface 7 of the working channel passage 4 does not present rotational symmetry over the entire length. In particular at the proximal end there is a transition sector 22 of the partitioning wall 8 at the upper part (as seen in drawings, that is) of the working channel wall 5 where the working channel wall 5, which forms the internal partitioning wall 8, becomes gradually thinner, i.e. tapers off, towards the proximal end. The thinnest part is the farthest away from the current carrying parts of the electronics in the electronics chamber 9, and therefore less prone to electrical breakdown, as the insulation distance provided by air in the electronics chamber 9 is longer.

This, in turn, allows the part adjacent to the proximal end face 15 of the working channel passage to be arranged at an angle different from perpendicular to the housing centre axis of the cylindrical housing part and to the axis of rotational symmetry c of the part of the working channel passage 4 having rotational symmetry. That is to say, a centre line part c' of working channel 4 bends off from the axis of rotational symmetry c of the working channel passage 4, which is otherwise parallel to the housing centre axis C at an angle α at the proximal end, so as to end as a normal to the proximal end face 15. Preferably, the proximal end face is perpendicular to the angled part adjacent the proximal end face. This, in turn, means that the working channel tube 17 will be arranged at an angle to the housing centre axis C, allowing the flexible working channel tube 17 to be directed towards the centre of the insertion tube 12, as can be seen in FIG. 4. This is a more ideal location from a bending point of view of the insertion tube. This centre location, however, is not possible in the tip housing 3, where space is sparse and electronics etc. has to be accommodated together with the working channel passage 4 which therefore needs to be off-set from the central axis of the insertion tube 12. The angle between the angled part adjacent the proximal end face and the frusto-conical part of the working channel passage 4, is preferably provided by insertion of abutting oppositely tapered cores, which are then after moulding retracted in opposite directions out of the working channel passages 4 of the moulded tip part. Where such abutting cores meet an insignificant 26 defect in the otherwise smooth surface will arise, as can be seen in FIG. 5.

It furthermore turns out that this angled arrangement is advantageous in terms of the glue bond between the working channel tube 17 and the tip housing 3. That is to say, in addition to the essentially uniform layer of adhesive between the two abutting end surfaces 15, 16 of the working channel tube 17 and the working channel passage 4, respectively, the taper and angling will provide pockets 18, 19, 20 for accommodating additional glue and thereby strengthening the joint.

These pockets 18, 19, 20 can best be seen in FIG. 4 where a mandrel 21 has been temporarily inserted in order to support and stabilize the working channel tube 17 and the tip housing 3 during the gluing process by which they are joined. Glue trapped in the pocket 20 in the inner transition between the working channel tube 17 and the working channel passage 4 may further smooth out this transition, so that the risk of inserted instruments getting caught is reduced. Alternatively, as shown in FIG. 5, the inner transition may be smoothed by thickening, i.e. gradually increasing the thickness of a wall section 23 of the external wall at the opposite side of the tapered wall section 22 to keep the inner diameter of the working channel passage 4 constant.

The mandrel 21 preferably has a central section 29 with a circular cross-section having an outer diameter matching the inner diameter d of the working channel tube 17 so as to engage the inside of the working channel tube 17 and hold it firmly during the gluing process where the working channel tube 17 is joined to the working channel passage 4. From this central section it tapers off along sections 30 and 31 in opposite directions so as to allow insertion through the distal end of the working channel passage 4 and into the angled working cannel tube 17. The section 30 which is adapted to be inserted into the working channel tube 17 during the joining thereof with the working channel passage 4 is preferably frusto-conical. The same may apply to the section 31.

With this angling and these two ways of achieving the smooth transition, the wall thickness of the major part of the lower external wall part 6 of the working channel passage 4 can be made thinner, as it does no longer have to match the wall thickness of the working channel tube 17 plus the additional thickness of the glue flange 10. Minimum thickness of the glue flange is considered to be around 0.1 mm to be manufactured and have the required strength. Hence by providing a working channel which is not parallel with the housing central axis C of the tip part, but instead angled by an angle less than 15°, e.g. approximately 6° or even just 1°, the external diameter of the tip part can be reduced by 0.1 mm.

Turning now to FIG. 6 a further embodiment of the tip housing 3 according to the present disclosure is shown in longitudinal section.

This embodiment differs from the previously described embodiments in that not only a part of the working channel passage 4 is angled with respect to the remainder. Instead the entire axis of rotational symmetry c of the frusto-conical working channel passage 4 is arranged at an angle α, with respect to the centre axis C of the cylindrical part of the tip housing 3. Angling the entire working channel passage 4 in this manner allows the thickness of the partitioning wall 8 to be kept constant along the length if the angle α between the axis of rotational symmetry c and the centre axis C of the tip housing corresponds to the conicity of the frusto-conical working channel passage 4, or if it exceeds it even taper off towards the proximal end, in turn, allowing more thickness to be dedicated to the glue flange 10. The trade-off us that the external wall 6 becomes much thinner at the distal end of the tip housing 3. This however is less critical, and as can be seen by comparison with FIGS. 3-5 a wall may not even be needed at that location.

As can be seen in FIG. 6 a cut-out 24 in the glue flange 10 in the axial direction at the external wall 6 may be provided. A larger cut-out 25 is provided at the top (as seen in e.g. FIGS. 3 and 5), where no glue flange 10 is thus associated with the proximal end surface 15. That is to say, the glue flange 10 is essentially an upwardly open trough. This facilitates the gluing during manufacture, because when the working channel tube 17 has been placed in proper abutment with the proximal end surface 15, a drop of glue can then be placed on top of the working channel tube 17 from where it will flow down along the outer surface of the working channel tube 17 under gravitational influence, and seep into the gaps between glue flange 10 and the outer surface of the working channel tube 17 under influence of gravitation and capillary effect, as well as into any gap between the proximal end surface 15 and the distal end 16 of the working channel tube 17. The angle α between the axis of the cylindrical inner surface of the working channel passage 4, and the proximal end surface 15 perpendicular to the angled part of the working channel passage 4 need not deviate much from perpendicular to achieve the desired improvements. In fact, just a single degree will suffice. In preferred embodiments the angle α is thus preferably in the interval between 1° and 15°, in particular approximately 6°, or 1.03°.

Depending on the designated use of the endoscope typical dimension may be as follows.

TABLE 1

| Tip part dimensions | Urethroscope | Bronchoscope |
|---|---|---|
| Outer diameter | 2.9 mm | 5.4 mm |
| Working channel diameter | 1.2 mm | 2.2 |
| Length | 7.75 mm | 8 mm |
| Partition wall thickness | 0.16 mm | 0.25 |
| External wall thickness | 0.16 mm | 0.25 |
| Glue flange thickness | 0.1 mm | 0.1 mm |
| Angle of working channel passage | 6° (proximal), 0° (distal) | 1.03° |

The invention claimed is:

1. An endoscope comprising:
a handle;
an insertion tube including a tip part at a distal end thereof, the tip part including a housing, the housing including:
a housing centre axis (C),
an outer diameter (D),
at least one section having a cylindrical circumferential surface, and
a working channel passage comprised of a working channel passage wall having a working channel passage inner wall surface, the working channel passage having a distal end and a proximal end comprising a proximal end face surface, the working channel passage also having a working channel passage centre axis, and the working channel passage inner wall surface comprising at least one inner surface wall section having rotational symmetry about the working channel passage centre axis and extending at least partially between the proximal end and the distal end of the working channel passage; and
a working channel tube extending from the handle through the insertion tube and having a distal end, the working channel tube having a distal end face surface adjacent the proximal end face surface of the working channel passage with a layer of adhesive between them forming a connection between the working channel tube and the working channel passage of the housing,
wherein the distal end of the working channel tube is arranged at a non-zero angle to the housing centre axis (C).

2. The endoscope of claim 1, wherein the non-zero angle with respect to the housing centre axis (C) is in the interval between 1° and 15°.

3. The endoscope of claim 2, wherein the non-zero angle is in the interval between 1.03° and 6°.

4. The endoscope of claim 2, wherein the distal end of the working channel tube comprises a working channel centre axis, and wherein the proximal end face surface of the working channel passage is orthogonal to the working channel centre axis.

5. The endoscope of claim 1, wherein a ratio of an internal diameter of the working channel tube to the outer diameter of the tip part is at least 0.40.

6. The endoscope of claim 5, wherein the outer diameter of the tip part is at most 2.9 mm.

7. The endoscope of claim 1, wherein the working channel passage wall comprises an internal partitioning wall having an internal partitioning wall transition sector adjacent the proximal end face surface of the working channel passage, and wherein in the internal partitioning wall transition sector a thickness of the internal partitioning wall is gradually reduced towards the proximal end face surface of the working channel passage.

8. The endoscope of claim 7, wherein the housing comprises an external wall opposite the internal partitioning wall, wherein the external wall comprises an external wall transition sector adjacent the proximal end face surface of the working channel passage, and wherein in the external wall transition sector a thickness of the external wall is gradually increased towards the proximal end face surface of the working channel passage.

9. The endoscope of claim 8, wherein the thickness of the internal wall reduces as the thickness of the external wall increases.

10. The endoscope of claim 9, wherein the thickness of the internal wall reduces as the thickness of the external wall increases to maintain a constant diameter in the proximal end of the working channel passage.

11. The endoscope of claim 9, wherein the thickness of the internal wall reduces as the thickness of the external wall increases so as to match a diameter of the working channel passage to an internal diameter of the working channel tube.

12. The endoscope of claim 7, further comprising an imaging system including electronic components, wherein the housing further comprises a compartment for accommodating the electronic components, the compartment being separated from the working Confidential channel passage by the internal partitioning wall.

13. The endoscope of claim 1, wherein the working channel passage wall comprises an internal partitioning wall, wherein the housing comprises an external wall opposite the internal partitioning wall, wherein the external wall comprises an external wall transition sector adjacent the proximal end face surface of the working channel passage, and wherein in the external wall transition sector a thickness of the external wall is gradually increased towards the proximal end face surface of the working channel passage.

14. A method of manufacturing the endoscope of claim 1, said method comprising:
   providing the working channel tube;
   providing the housing; and
   joining the distal end face surface of the working channel tube and the proximal end face surface of the working channel passage with a layer of an adhesive between them to form a joint.

15. The method of claim 14, further comprising inserting a mandrel through the working channel passage from the distal end of the working channel passage into the working channel tube before said joining.

16. The method of claim 15, wherein pockets are formed adjacent the joint, further comprising filling the pockets with the adhesive.

17. The method of claim 16, wherein the housing comprises an external wall, wherein at least one of the pockets is formed between the external wall and the mandrel, and wherein filling the at least one of the pockets causes the adhesive to form a smooth transition between the working channel tube and the working passage inner wall surface.

18. A system comprising a display unit and an endoscope according to claim 1.

* * * * *